United States Patent [19]

Thiessen

[11] Patent Number: 4,586,444
[45] Date of Patent: May 6, 1986

[54] LIQUID CHEMICAL INCORPORATOR ASSEMBLY

[76] Inventor: Cornelius Thiessen, Box 92, Miami, Manitoba, Canada, R0G 1H0

[21] Appl. No.: 607,936

[22] Filed: May 7, 1984

[51] Int. Cl.⁴ .............................................. A01C 23/02
[52] U.S. Cl. ......................................... 111/6; 172/60;
   172/112; 172/117; 172/123; 111/73
[58] Field of Search .................... 111/6, 7, 73, 80, 18,
   111/62; 172/56, 57, 59, 60, 111, 112, 117, 47

[56] References Cited

U.S. PATENT DOCUMENTS

| | | | |
|---|---|---|---|
| 3,194,193 | 7/1965 | Walters | 111/6 |
| 3,194,194 | 7/1965 | Phelps | 111/6 |
| 3,316,865 | 5/1967 | Williams | 111/6 |
| 3,367,293 | 2/1968 | Cox | 111/6 |
| 3,398,707 | 8/1968 | McClenny | 111/80 X |
| 3,661,213 | 5/1972 | Taylor | 111/6 X |
| 3,741,137 | 6/1973 | Eisenhardt | 111/6 |
| 3,810,434 | 5/1974 | van der Lely et al. | 172/112 X |
| 3,826,314 | 7/1974 | van der Lely et al. | 172/112 X |
| 3,970,012 | 7/1976 | Jones | 111/6 |
| 4,108,089 | 8/1978 | van der Lely | 111/73 X |
| 4,152,993 | 5/1979 | van der Lely | 111/73 X |
| 4,211,175 | 7/1980 | van der Lely | 111/6 |
| 4,278,036 | 7/1981 | Buchele | 111/73 X |
| 4,372,397 | 2/1983 | Goertzen et al. | 172/112 X |
| 4,409,910 | 10/1983 | Hoyle et al. | 111/73 X |

Primary Examiner—Robert A. Hafer
Assistant Examiner—Danton DeMille
Attorney, Agent, or Firm—Stanley G. Ade

[57] ABSTRACT

Liquid applications of materials such as herbicides usually are broadcast over the field and then incorporated by harrowing or the like. The present device utilizes a plurality of open based boxes having a rotary cultivator therein with a spray nozzle attached to a supply of liquid chemical under pressure thus restricting the application of the chemical to a band the width of the box and incorporating it at the same time. Rake teeth smooth out the soil behind each applicator and a seeding or planting machine may be hitched behind the incorporator followed by a packer so that the entire chemical treatment, incorporation thereof, planting and packing can be undertaken in one pass over the field.

4 Claims, 7 Drawing Figures

LIQUID CHEMICAL INCORPORATOR ASSEMBLY

BACKGROUND OF THE INVENTION

This invention relates to new and useful improvements in the incorporation of liquid chemical with the top layer of soil in a field.

Liquid chemicals such as herbicides and the like, are normally broadcast over the field and then incorporated in approximately the top three inches in order to ensure an efficient control of weeds, but the cost of such chemicals is such that the treatment of a field becomes relatively expensive.

SUMMARY OF THE INVENTION

The present device overcomes these disadvantages by providing an assembly which restricts the chemical treatment to a band approximately ten to twelve inches wide and at the same time incorporates same in the top layer of soil. This permits the immediate planting of the seed behind the treating devices, followed by packing the soil so that only one pass is required.

By restricting the chemical to the relatively narrow bank in which the seed is planted, a considerable saving of chemical is assured.

In accordance with the invention there is provided an agricultural implement for seeding and incorporating chemical in bands spaced laterally of a working direction and movement of the implement, the implement including a frame, a plurality of seeder units mounted on the frame spaced laterally thereof, a plurality of liquid chemical incorporating assemblies each associated with and aligned forwardly relative to a respective one of the seeder units and each comprising an enclosed casing having an open base, means mounting the casing on the frame for floating movement relative to the ground with the open base exposed to the ground, means to convey liquid chemical to the casing for spraying on the ground and soil breaking teeth mounted on an axle fixed to the casing for rotation about a substantially horizontal axis within the casing, a power source on the frame and flexible coupling means for coupling power from said power source to each of said casings for driving the teeth therein.

Another advantage of the invention is that the liquid chemical can be sprayed onto the ground, incorporated, smoothed and, if necessary, the seed planted and packed, all in one operation.

The principal advantage of the present invention is the placing of the liquid chemical in the band in which it is required for planting rather than broadcasting same over the entire field into which it must then be incorporated prior to planting.

The fact that the soil breaking teeth are driven by a power source on the frame which may comprise a power take-off shaft coupling from a tractor ensures that the soil is properly and fully broken without necessity for prior tilling. At the same time the floating mounting of the casing on the frame ensures that should the casing encounter a stone or other solid object it can ride up and avoid damage to the casing or to the soil breaking teeth.

In a particularly preferred arrangement, the casing is mounted on the frame by upwardly and forwardly extending arms leading from the casing to the frame and pivotally mounted on the frame for providing the floating movement. In addition the teeth are preferably of the type which include a portion parallel to the axle and are driven in a direction so as to drive the casing forwardly whereby the upwardly extending arms provide a component of force downwardly on the casing to ensure that it remains fully in contact with the ground to provide the necessary soil breaking action.

A tooth rake arrangement can be pivotally mounted at the rear of the casing for wiping over the broken soil to provide a smoothing action. The teeth of the rake and the pivotal action of the rake enable it to be used in trashy soils where otherwise trash would be collected and scraped into the casing thus eventually clogging the action of the casing and soil breaking teeth.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
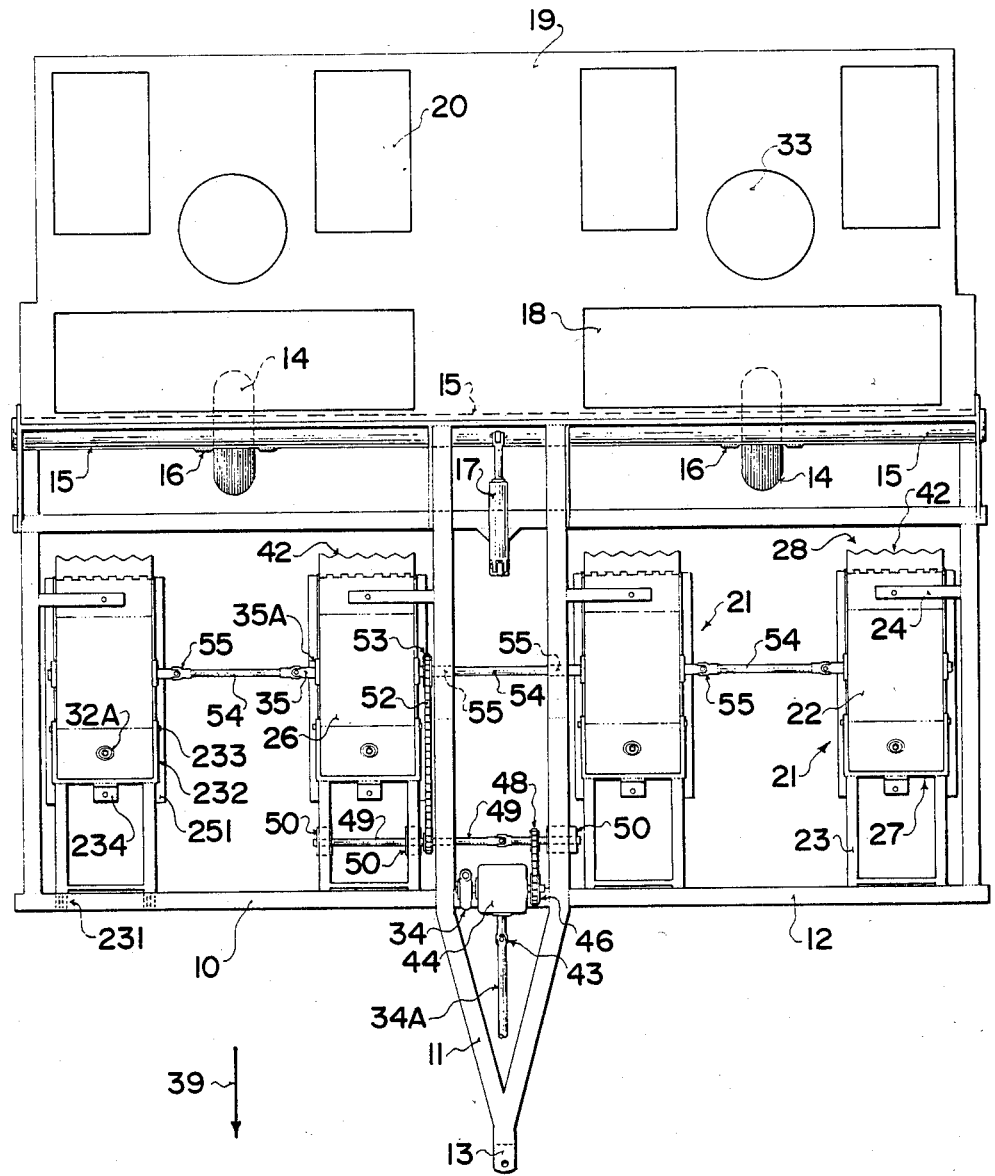
FIG. 1 is a partly schematic top plan view of an implement according to the invention including a plurality of incorporating assemblies.

Proceeding therefore to describe the invention in detail, reference should first be made to FIG. 1 which shows a substantially rectangular framework 10 having a hitch pole assembly 11 on the front member 12 thereof extending forwardly and terminating in a hitch 13 which enables the device to be secured to a tractor or other convenient source of power.

Wheels 14 are mounted adjacent to the rear member 15 of the framework upon forks 16 and a hydraulic piston and cylinder assembly 17 is connected to the framework so that the framework can be raised or lowered relative to the wheels in a conventional manner. It is not believed that further details of this raising and lowering apparatus need be disclosed as it is well known.

If necessary, conventional seed planting devices 18 each including a pair of planters may be supported in an extension 19 of the framework followed by conventional packers 20, all of which are conventional in construction. Situated within a framework 10 is a plurality of liquid chemical incorporating devices collectively designated 21. Each of these is arranged in alignment with a respective seed planter and consists of a casing 22 supported between the front members 12 and 15 of the framework with a pair of arms 23 extending forwardly and upwardly from the casing and being pivotally secured to the front member 12 on pivot couplings 231. The arms are also pivotally connected to the casing by a frame 252 at pivot pins 233 with the angle between the arms 23 and the casing being adjustable by couplings 234. A single member 24 extends rearwardly of the casing and is secured to the rear frame member 15.

Referring to FIGS. 2, 3, 4 and 6, each casing 22 includes a pair of spaces and parallel side plates 25, a top plate 26, a rear plate collectively designated 27 and a front plate collectively designated 28, all of these plates forming an enclosure or casing having an open base and being situated within the framework so that, when in operation, the lower edges 25A of the side plates 25, engage the surface of the ground so that a complete enclosure is formed.

The rear wall 27 includes the inclined upper portion 29 and the lower substantially vertical portion 30. A spray nozzle assembly 31 is secured within a depression 32A formed in the sloping wall portion 29 and a flexible hose 32 extends externally of the casing, and is operatively connected to the nozzle 31. This hose 32 extends to a source of liquid chemical which may be contained in a tank 33 located, for example, behind one of the seeding devices 18. The tank can be mounted in any convenient location.

A pump 34 is driven from the power take-off 34A as will hereinafter be described and the hoses are operatively connected between the spray nozzles 31, the pump 34 and the tank 33 so that, when in operation, liquid chemical is sprayed into the interior of each of the casings 22 and is restricted to the area covered by the casings and incorporated within a band of soil substantially equal to the width of the casing between the two side plates 25 as will hereinafter be described.

Figure 6:
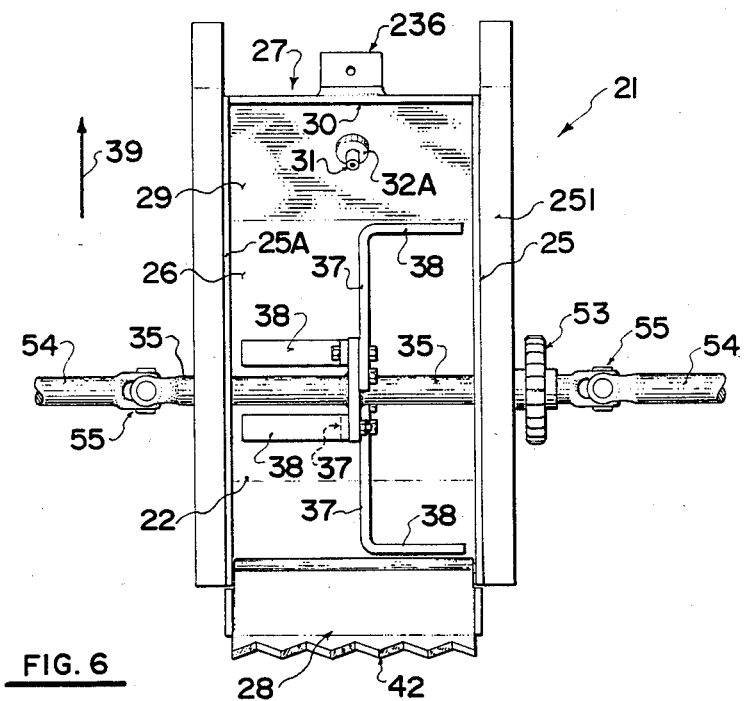
FIG. 6 is an underside view of one of the incorporating assemblies.

Each casing is provided with a shaft 35 journalled for rotation in bearings 35A and extending between the two side plates 25 so that it extends across the casing as clearly shown and a plurality of ground breaking blades or elements 36 are secured to the shaft and extend radially therefrom with each element consisting of a radially extending portion 37 and a right angulated outer portion 38 as shown in FIG. 6. Needless to say, other types of ground breaking elements may be used, if desired.

Figure 2:
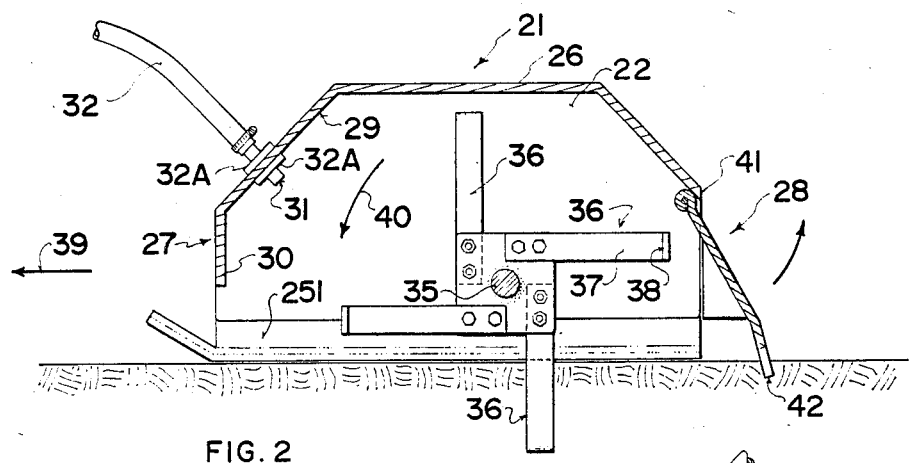
FIG. 2 is an enlarged longitudinal section of one of the incorporating assemblies.
Figure 3:
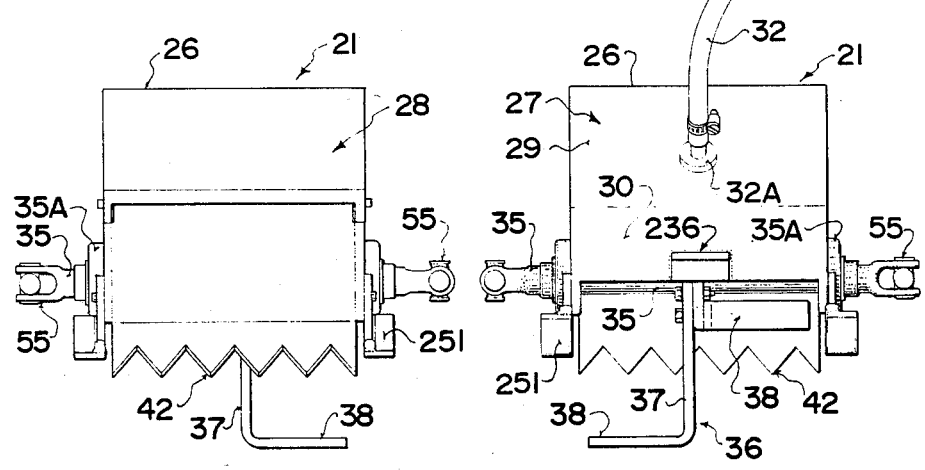
FIG. 3 is a rear view of FIG. 2.
Figure 4:
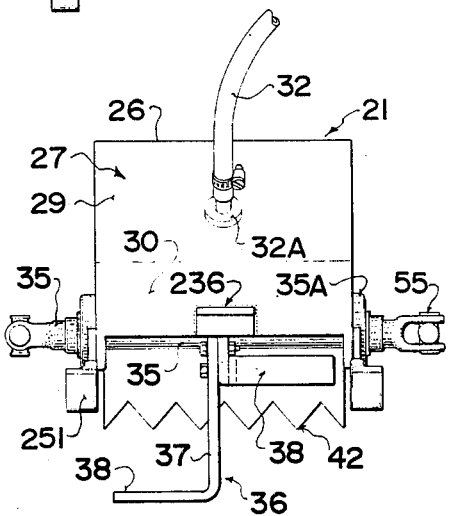
FIG. 4 is a front view of FIG. 2.

The situation of shaft 35 together with the length of the elements 36 is such that when in operation and in a position shown, for example in FIG. 2, the ends of the ground breaking elements engage approximately three to five inches below the surface of the soil.

When the implement is moving in the direction of arrow 39, it will be appreciated that liquid chemical sprayed into the casing is then incorporated by the ground breaking rotary assembly or elements 36 which rotate in the direction of arrow 40.

The rear wall 28 is pivotally connected to any inclines downwardly and rearwardly from a lower rear edge 41 of the casing and terminates in a plurality of raking teeth 42 which engage just below the surface of the soil and act to smooth the soil which has been broken by the members 36, together with the liquid chemical incorporated by this rotary breaking action.

Figure 5:
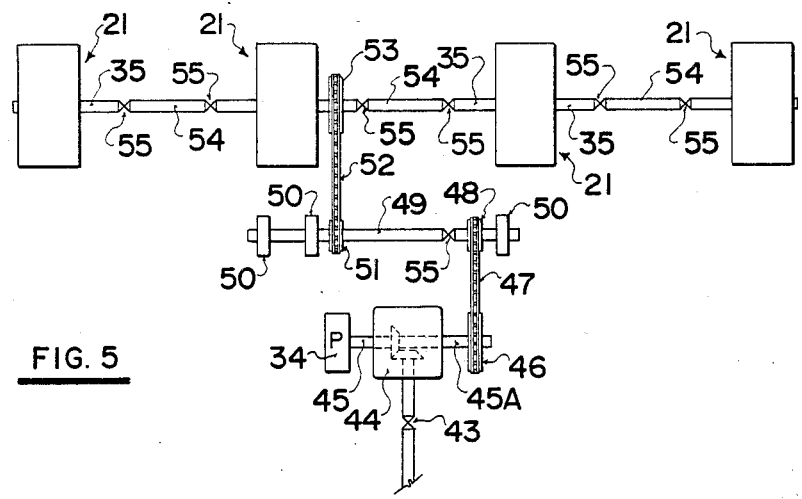
FIG. 5 is a schematic plan view of the drive system of the device.

Drive means are shown schematically in FIG. 5 with the power take-off from the tractor or the like being indicated by shaft 35. A universal joint 43 connects this shaft to a gear box 44 mounted mounted within the framework and drives a transverse shaft 45 extending upon each side of the gear box. One end of the shaft 45 is operatively connected to pump 34 and the other end specifically designated 45A, is provided with a sprocket 46 around which chain 47 engages. The chain extends around a further sprocket 48 mounted upon a drive shaft 49 journalled within bearings 50 and supported within the framework 10.

A further sprocket 51 is connected to shaft 49 and a chain 52 extends around this sprocket and around a sprocket 53 secured to a transverse drive shaft train 54 which extends between adjacent incorporating assemblies 21, being connected to the shafts 35 thereof by means of universal joints 55.

The side walls 25 at their lower edges carry skids 251 which can run along the ground. The angle adjustment of the casing relative to the arms 23 as provided by the bracket 234 can be used to change the angle of the skids relative to the ground by raising the front edge of the skids. This enables the casing to accommodate high levels of trash in the soil particularly where straw stalks are remaining in the soil prior to the passage of the casing over the soil and the incorporation of the liquid chemical. In addition the hinged connection of the rear rake portion 28 enables the casing to allow the trash to escape from the rear and avoid the collection of trash within the casing.

The direction of rotation of the teeth 36 in conjunction with the arrangement of the arms 23 ensures that the casing is pushed forwardly by the teeth and thus downwardly by the arms into contact with the ground to avoid the teeth lifting out of the ground when the ground becomes particularly hard. However engagement with stones or other solid objects still allows the teeth and the casing to ride over the stones by pivotal movement of the arms 23 about the pivot connections 231. In addition it will be noted that the axle 35 supporting the teeth is fixed relative to the sides of the casing and is connected to the power source provided by the gear box 44 via flexible couplings provided by the universal joints in the shafts 54, 55.

Figure 7:
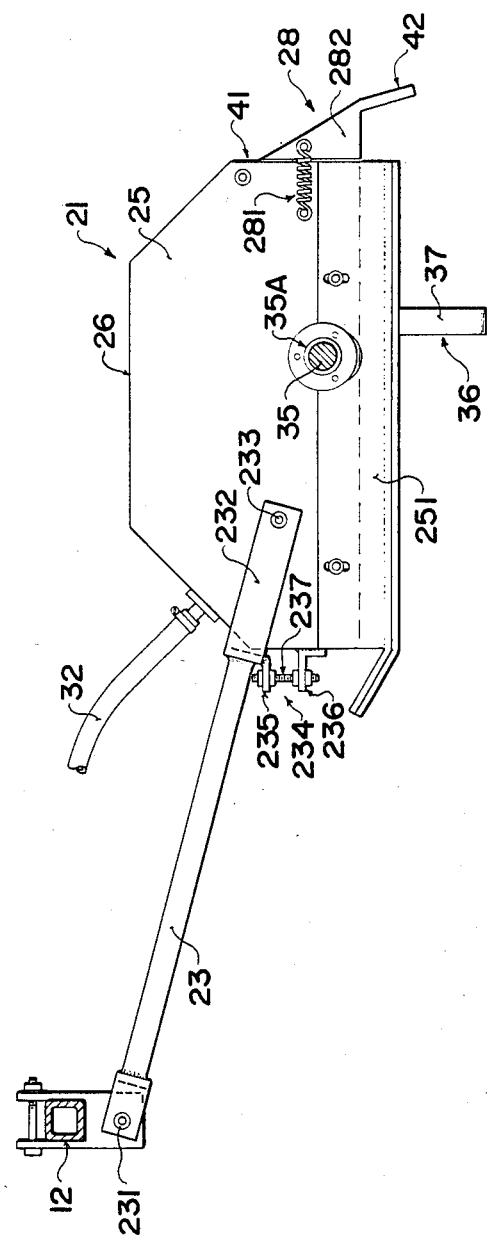
FIG. 7 is a side elevational view of one of the assemblies.

Referring now to FIG. 7, it will be noted that the skids 251 are mounted on the side walls 25 of the casing by bolts passing through slots in the skids which allow adjustment of the height of the skid relative to the respective side wall. In addition the rake portion 28 is coupled to the casing by a spring 281 which passes the rake into contact with the rear face of the side walls 25. For this purpose the rake portion 28 includes side walls 282 which project toward the casing itself forwardly of the rake portion.

The bracket 234 is shown in more detail incorporating a flange 235 attached to the frame 232 and a flange 236 attached to the casing with an adjustment bolt 237 extending therebetween.

It will therefore be appreciate that liquid chemical may be incorporated in a relatively narrow band of soil by means of the enclosing casings 26 of the incorporators 21, together with the rotary ground breakers 36 and the conventional planters 18 are situated behind the framework 10 in alignment with the chemical incorporators 21 so that seed may be planted within the smoothed, chemically treated soil immediately after it has been chemically treated.

Finally, packers 20 may be provided to complete the one pass operation possible with the use of the present invention.

This not only saves money and time, but also conserves moisture as only a relatively small strip of soil is treated and disturbed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural implement for seeding and incorporating chemical in bands spaced laterally of a working direction and movement of the implement, the implement including a frame, a plurality of seeder units mounted on the frame spaced laterally thereof, a plurality of liquid chemical incorporating assemblies each associated with and aligned forwardly relative to a respective one of the seeder units and each comprising an enclosed casing having an open base, means to convey liquid chemical to the casing, nozzle means arranged to spray said liquid chemical on the ground within the casing and soil breaking teeth mounted on an axle fixed to the casing for rotation about a substantially horizontal axis within the casing, the soil breaking teeth including a portion extending radially from said axle and a portion bent relative thereto so as to lie substantially parallel to the axle and radially spaced therefrom, a power source on the frame, flexible coupling means for coupling power from said power source to each of said casings for driving the teeth therein, toothed raking means pivotally mounted on a rear portion of said casing for pivotal movement about a horizontal axis transverse to said casing for smoothing the soil behind said incorporating assembly and means mounting the casing on the frame for floating movement relative to the ground with the open base exposed to the ground, said mounting means comprising strut means extending forwardly and upwardly from the casing to the frame, said strut means being coupled to the frame for pivotal movement thereto so as to allow upward floating movement of the casing relative to the ground, the direction of rotation of said teeth being arranged so as to drive the casing forwardly whereby a reaction from said upwardly and forwardly extending means provides a component of force downwardly on the casing to force said casing against the ground, and a pair of horizontal skids mounted on said casing at lower side edges thereof for running along the ground in contact therewith.

2. The invention according to claim 1 wherein the toothed raking means is formed on the lower edge of a rear plate of said casing, said rear plate inclining rearwardly and downwardly from said casing with at least the raking means being spaced rearwardly from the rear edges of side plates of said casing.

3. The invention according to claim 1 including means for adjusting the angle between the casing and said upwardly and forwardly directed support means.

4. The invention according to claim 1 wherein the height of the skids relative to the side walls of the casing is adjustable so as to adjust the height of the axle relative to the ground.

* * * * *